United States Patent
Sourour et al.

(10) Patent No.: US 6,768,727 B1
(45) Date of Patent: Jul. 27, 2004

(54) FAST FORWARD LINK POWER CONTROL FOR CDMA SYSTEM

(75) Inventors: Essam Sourour, Cary, NC (US); Roozbeh Atarius, Morrisville, NC (US); Ali Khayrallah, Apex, NC (US)

(73) Assignee: Ericsson Inc., Research Triangle Park, NC (US)

(*) Notice: Subject to any disclaimer, the term of this patent is extended or adjusted under 35 U.S.C. 154(b) by 835 days.

(21) Appl. No.: 09/711,219

(22) Filed: Nov. 9, 2000

(51) Int. Cl.[7] ............................................. H04Q 7/216
(52) U.S. Cl. ..................................... 370/335; 370/342
(58) Field of Search ............................. 370/335, 342, 370/336, 337, 338, 363, 344, 345, 252, 206, 208; 455/522

(56) References Cited

U.S. PATENT DOCUMENTS

| | | | |
|---|---|---|---|
| 6,151,328 A | * 11/2000 | Kwon et al. | 370/441 |
| 6,252,865 B1 | * 6/2001 | Walton et al. | 370/335 |
| 6,275,478 B1 | * 8/2001 | Tiedemann, Jr. | 370/318 |
| 6,442,155 B1 | * 8/2002 | Suk et al. | 370/342 |
| 6,463,048 B1 | * 10/2002 | Garyantes | 370/342 |
| 6,542,488 B2 | * 4/2003 | Walton et al. | 370/335 |

FOREIGN PATENT DOCUMENTS

| | | |
|---|---|---|
| WO | WO 99/66743 | 12/1999 |
| WO | WO 99/66744 | 12/1999 |
| WO | WO 00/36764 | 6/2000 |
| WO | WO01/01604 A1 | 1/2001 |

* cited by examiner

*Primary Examiner*—Douglas Olms
*Assistant Examiner*—Ricardo M. Pizarro
(74) *Attorney, Agent, or Firm*—Coats & Bennett, P.L.L.C.

(57) ABSTRACT

A method of forward link power control in a CDMA mobile communication system is adapted for diversity transmission. First and second diversity signals are transmitted from a base station to a mobile terminal. The mobile terminal derives first and second channel quality estimates associated with the first and second diversity signals respectively. The mobile terminal uses the channel quality estimates to derive first and second power control codes which it transmits to said base station. The base station adjusts the transmit power of first and second antennas associated with the base station based on the first and second power control codes, respectively.

23 Claims, 7 Drawing Sheets

FAST FORWARD LINK POWER CONTROL FOR CDMA SYSTEM

BACKGROUND OF THE INVENTION

The present invention relates generally to Code Division Multiple Access systems and, more particularly, to power control methods useful in Code Division Multiple Access systems.

Numerous access schemes exist to allow multiple users to share a communication medium. One such access scheme is known as Code Division Multiple Access (CDMA). CDMA is a form of multiple access employed by spread-spectrum communication systems. In CDMA systems, a wideband spreading signal is used to convert a narrowband data sequence to a wideband signal. The spreading signal typically comprises a pseudo noise (PN) sequence that has a chip rate several orders of magnitude higher than the data rate of the data sequence. The resulting wideband signal occupies a bandwidth in excess of the minimum bandwidth required to transmit the data sequence.

One spread spectrum technique employed in CDMA systems is known as direct sequence spread spectrum. In direct sequence spread spectrum systems, the data sequence modulates a PN sequence, which serves as the spreading signal, to generate a wideband signal. Modulation may be achieved, for example, by applying the data sequence and PN sequence to a product modulator or multiplier. Multiplication of two signals produces a signal whose spectrum equals the convolution of the spectra of the component signals. If the data sequence is narrowband and the PN sequence is wideband, the product of the data sequence and PN sequence is a wideband signal whose spectrum is nearly equal to the spectrum of the PN signal. Thus, the PN sequence functions as a spreading signal.

In CDMA systems, multiple users may use the same carrier frequency and may transmit simultaneously. Each user has its own PN sequence which is approximately orthogonal to the PN sequences of other users. Transmissions to or from individual users are imprinted with that user's PN sequence. The receiver selects the desired signal, which combines in the communication channel with unwanted signals, by performing a correlation operation. That is, the receiver correlates the received signal with the PN sequence of the desired signal. All other signals are spread by the PN sequence and appear as noise to the receiver.

Power control is used on the reverse link in CDMA systems to control the power of signals received at the base station. The purpose of power control is to assure that each mobile terminal served by a particular base station provides approximately the same signal level to the base station receiver. In CDMA systems, the system capacity is maximized if each mobile transmitter power level is controlled so that its signal arrives at the base station receiver with the minimum required signal-to-interference ratio (SIR).

The current standard for CDMA systems in the United States is contained in a specification published by the Telecommunications Industry Association and Electronics Industry Association (TIA/EIA) as IS-95. New standards for wideband CDMA are currently being developed in North America, Europe, and Japan, which offer significant performance improvements compared to the current CDMA standard. One of the new features that contributes to the improved performance of wideband CDMA is fast forward link power control (FFLPC). FFLPC combats Rayleigh fading in the forward link propagation channel at slow user mobility. Power control for fast user mobility is not easily achievable within the current CDMA standards.

In the new CDMA standards, forward link power control is implemented by the base station with the aid of the mobile terminal. The base station commands the mobile terminal to maintain a predetermined signal quality standard, such as the frame error rate (FER). The mobile terminal maps the target FER into a target signal-to-interference ratio (SIR) that is required to achieve the target FER. The mobile station estimates the SIR continuously and sends power control bits to the base station multiplexed into the reverse pilot channel. If the measured SIR is below the target SIR, the mobile station sends a power control bit (PCB) with a value of +1 to request an increase in its transmit power. If the measured SIR is above the target SIR, the mobile terminal sends a PCB with a value of −1 to request a decrease in its transmit power. In response, the base station may increase or decrease its transmit power on the forward traffic channel assigned to the mobile terminal by a value $\Delta P$. The base station operates at the new power level for a period of time T until it receives a new power control bit from the mobile terminal. Normally, the time T is the duration of one power control group (PCG). Each forward traffic channel frame, which has a duration of 20 milliseconds, consists of sixteen PCGs, each with a duration of 1.25 milliseconds. A PCB is transmitted during each PCG so that a total of sixteen PCBs are transmitted in a frame.

BRIEF SUMMARY OF THE INVENTION

The present invention is a method of forward link power control in a CDMA mobile communication system. The base station transmits first and second diversity signals to a mobile terminal from respective first and second antennas. The mobile terminal derives channel quality estimates for the propagation channel from the first and second diversity signals. The first and second channel quality estimates are compared to a predetermined signal quality standard to generate a power control code for each of the first and second antennas. The power control code may for example comprise one or more power control bits. The mobile terminal transmits the first and second power control codes to the base station. The base station independently adjusts the transmit power of the first and second antennas based on the first and second power control codes, respectively.

DETAILED DESCRIPTION OF THE INVENTION

Figure 1:
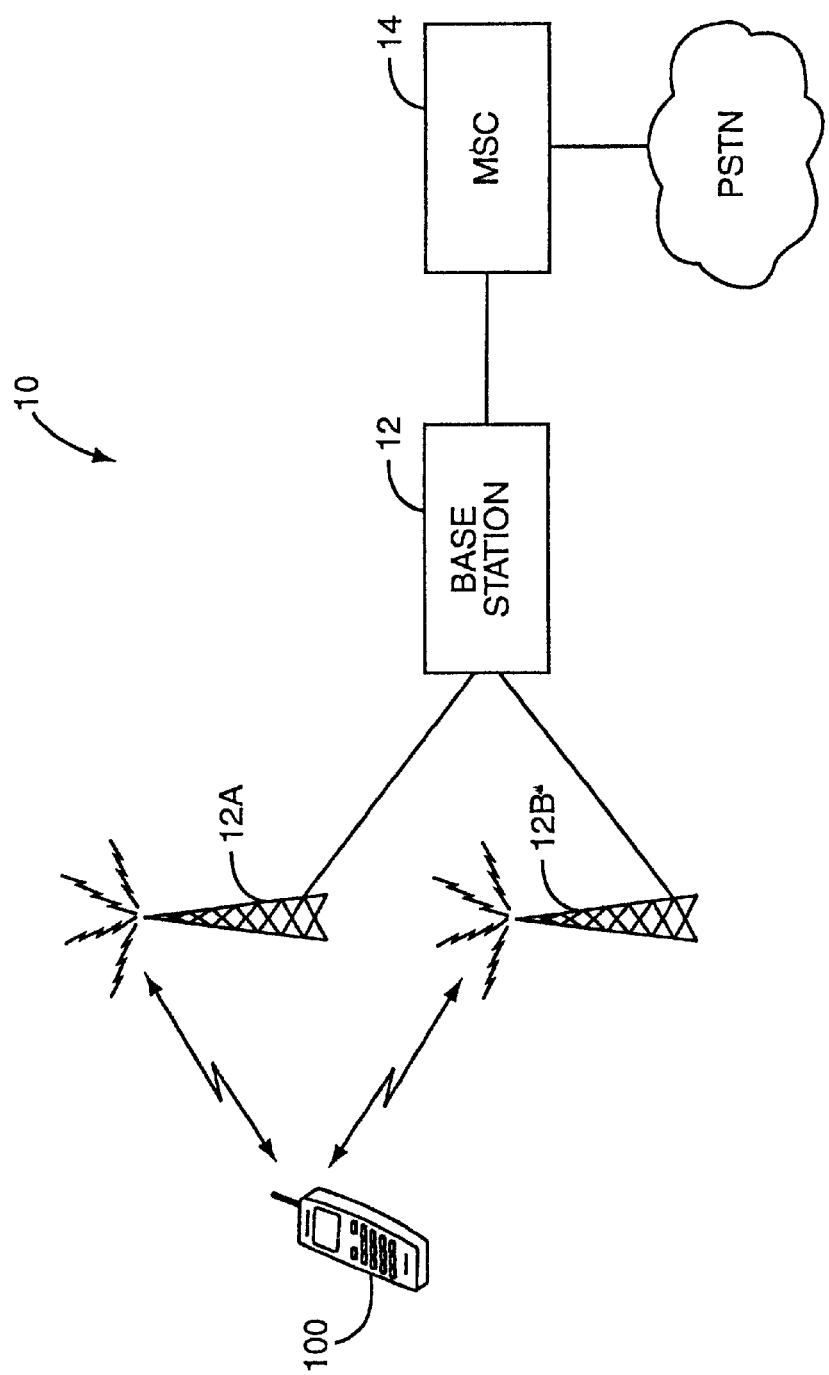
FIG. 1 is a functional block diagram of a wireless communication network implementing the forward link power control method of the present invention.

Referring now to FIG. 1, the present invention will be discussed in the context of a wireless communications network 10 supporting over-the-air communications between mobile terminals 100 and stationary receivers generally known as base stations 12. Base stations 12 connect via one or more mobile switching centers (MSC) 14 to external wireline networks such as the Public Switched Telephone Network (PSTN), the Integrated Services Digital Network (ISDN), and/or the Internet. Each base station 12 is located in and provides wireless communication services to a geographic region referred to as a cell. In general, there is one base station 12 for each cell within a given wireless communications network 10. The base station 12 in the disclosed embodiment has two transmit antennas 12a, 12b to simultaneously transmit first and second diversity signals. Within each cell, there may be a plurality of mobile terminals 100 that communicate via a radio link with a serving base station 12. The base station 12 allows the user of the mobile terminals 100 to communicate with other mobile terminals 100, or with users connected to the external network. The MSC 14 routes calls to and from the mobile terminal 100 through the appropriate base station 12 or gateway, i.e., interface between a MSC 14 and external network.

Many standards exist for wireless communication networks 10. Such standards are published for example by the Telecommunications Industry (TIA), Electronics Industry Association (EIA), and European Telecommunications Standards Institute (ETSI). The existing standards use a variety of different multiple access technologies including Frequency Division Multiple Access (FDMA), Time Division Multiple Access (TDMA), and Code Division Multiple Access (CDMA). An exemplary standard for FDMA systems is the Advanced Mobile Phone System (AMPS) standard used in the United States, which is becoming obsolete because of bandwidth limitations. Exemplary standards for TDMA systems include the U.S. Digital Cellular (USDC) standard published as Interim Standard IS-54 by the EIA, the TIA/EIA-136 standard currently employed in the United States, the Global System for Mobile Communications (GSM) standard published by ETSI currently employed in Europe, the Pacific Digital Cellular (PDC) standard currently used in Japan, and the Cellular Digital Packet Data (CDPD) standard. Exemplary standards for CDMA systems include TIA/EIA Interim Standard IS-95, TIA/EIA Interim Standard IS-2000, known as cdma2000, currently in development in the United States, and the Wideband CDMA (WCDMA) standard currently being developed for Europe. Standards also exist for satellite communication networks, such as the Globalstar network. This listing of standards is not exhaustive but merely reflects the variety of communication standards currently employed. The present invention was originally conceived for use in CDMA systems and therefore the remaining discussion will focus on CDMA communication networks 10. However, the present invention could be adapted and employed in systems using other communication standards.

Figure 2:
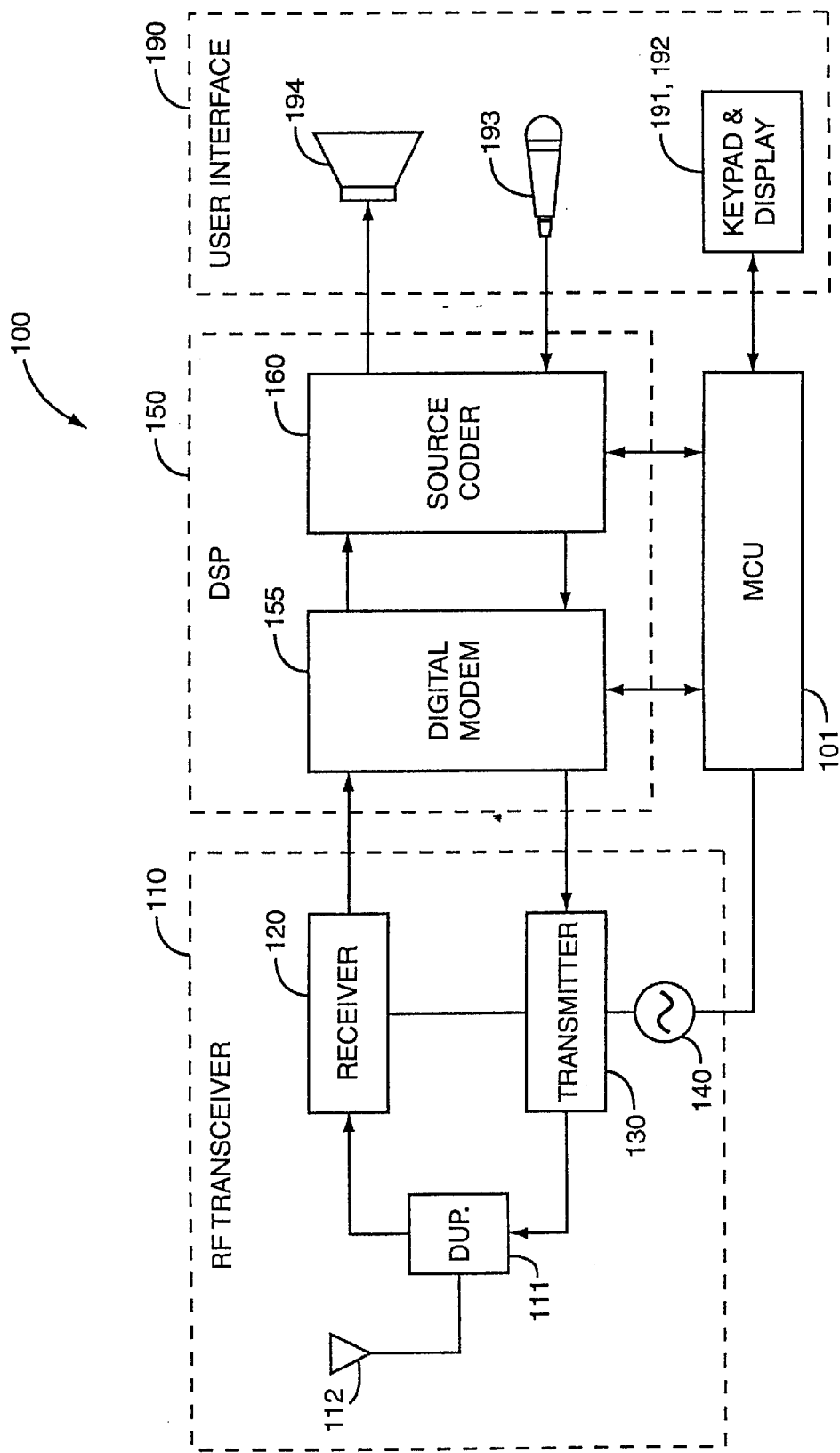
FIG. 2 is a functional block diagram of a mobile terminal in the mobile communication network of FIG. 1 implementing the forward link power control method of the present invention.

FIG. 2 is a block diagram of a mobile terminal 100. The term mobile terminal 100 as used herein includes a cellular radiotelephone; a Personal Communications System (PCS) terminal that may combine a cellular radiotelephone with data processing, facsimile and data communications capabilities; a Personal Digital Assistant (PDA) that can include a radiotelephone, pager, Internet/intranet access, Web browser, organizer, calendar; a conventional laptop and/or palmtop computer equipped with a radiotelephone transceiver, or other appliance that includes a radiotelephone transceiver. Mobile terminals 100 may also be referred to as "pervasive computing" devices.

Mobile terminal 100 comprises a microcontroller unit (MCU) 101, an RF transceiver 110, a digital signal processor (DSP) 150, and a user interface 190. Mobile terminal 100 may additionally include an external interface for communication with a computer, local area network, or other device.

RF transceiver 110 establishes a link for wireless communications with the base station 12. RF transceiver 110 comprises a receiver 120, transmitter 130, frequency synthesizer 140, duplexer 111, and antenna 112.

Receiver 120 receives downlink or forward link communications from the base station 12. Receiver 120 amplifies and downconverts received signals to the baseband frequency of the DSP 150. Signals converted by receiver 120 to the baseband frequency are referred to herein as baseband signals.

Transmitter 130 sends uplink or reverse link communications to the base station 12. Transmitter 130 receives baseband signals from the DSP 150, which the transmitter 130 amplifies and uses to modulate an RF carrier at a directed power level.

Frequency synthesizer 140 provides the reference signals used for frequency translation in the receiver 120 and transmitter 130.

Receiver 120 and transmitter 130 are coupled to antenna 112 by duplexer 111. Duplexer 111 includes a duplex filter to isolate the transmitter 130 from the receiver 120. The duplex filter combines a transmit-band filter and receiver-band filter to provide the necessary isolation between the two paths.

DSP 150 comprises a digital modem 155 and source coder 160. Source coder 160 includes a speech coder (not shown) for digitizing and coding speech for transmission on the reverse link to the base station 12. Additionally, the speech coder decodes speech signals received from the base station 12 and converts speech signals into audio signals that are output to speaker 194. CDMA systems use an efficient method of speech coding and error recovery techniques to overcome the harsh nature of the radio channel. One speech coding algorithm frequently used in CDMA systems is Code Excited Linear Predictor (CELP) speech coding. Speech is typically encoded at rates of 9.6 kilobits per second or 13.3 kilobits per second. The details of speech coding are not material to the invention and, therefore, are not explained in detail herein.

The digital modem 155 processes digital signals to make communication over the propagation channel more robust. Digital modem 155 includes a digital modulator 170 (FIG. 3) and at least one demodulator 180 (FIG. 4). The digital modulator 170 superimposes the message waveform onto a carrier for radio transmission using algorithms that guard against fading and other impairments of the radio channel while attempting to maximize bandwidth efficiency. Modulator 170 also performs channel coding and encryption if used. The digital demodulator 180 detects and recovers the transmitted message. It tracks the received signal, rejects interference, and extracts the message data from noisy signals. Demodulator 180 also performs synchronization, channel decoding, and decryption if used.

The MCU 101 supervises the operation of the mobile terminal 100 and administers the procedures associated with the communication protocol. The MCU 101 typically comprises a microprocessor, arithmatic logic unit (ALU), timers, and register files. The ALU performs various logic functions, such as comparisons, and supports computationally-demanding tasks. It may incorporate specialized hardware to accelerate mathematical operations, such as division and squaring. The MCU 101 assigns timers to track network time and uses that information to identify data frame boundaries and slot indexes. It also uses timers to trigger specific tasks as the mobile terminal 100 transitions to different operating modes, such as sleep, receive, and talk. The MCU 101 uses register files to store calibration data, the electronic serial number (ESN) of the user (used to authenticate the user), and other non-volatile information.

The MCU 101 implements the communication protocols used by the mobile terminal 100. The communication protocol specifies timing, multiple access approach, modulation format, frame structure, power level, as well as many other aspects of mobile terminal operation. The MCU 101 inserts signaling messages into the transmitted signals and extracts signaling messages from the received signals. MCU 101 acts on signaling messages received from the base station 12 as set forth in the communication protocol. When the user enters commands via the user interface 190, the commands are passed to the MCU 101 for action.

The MCU 101 also provides power management to the mobile terminal 100. Power management includes monitoring battery energy levels, charging the battery, and minimizing power consumption by changing modes. In general, there are three modes of operation for the mobile terminal 100: idle, receive, talk. In idle mode, the MCU 101 deactivates most functions except the digital system clock. In receive mode, the MCU 101 activates the RF receiver 120 and the digital modem 155. It demodulates the paging channel until it receives a valid paging message and then switches to talk mode. In talk mode, the entire mobile terminal 100 is activated to support two-way communication.

The MCU 101 and DSP 150 use dedicated or shared buses to connect to memory (not shown). Memory is typically segmented into blocks that hold the start-up code, control software, DSP firmware, and temporary data.

Figure 3:
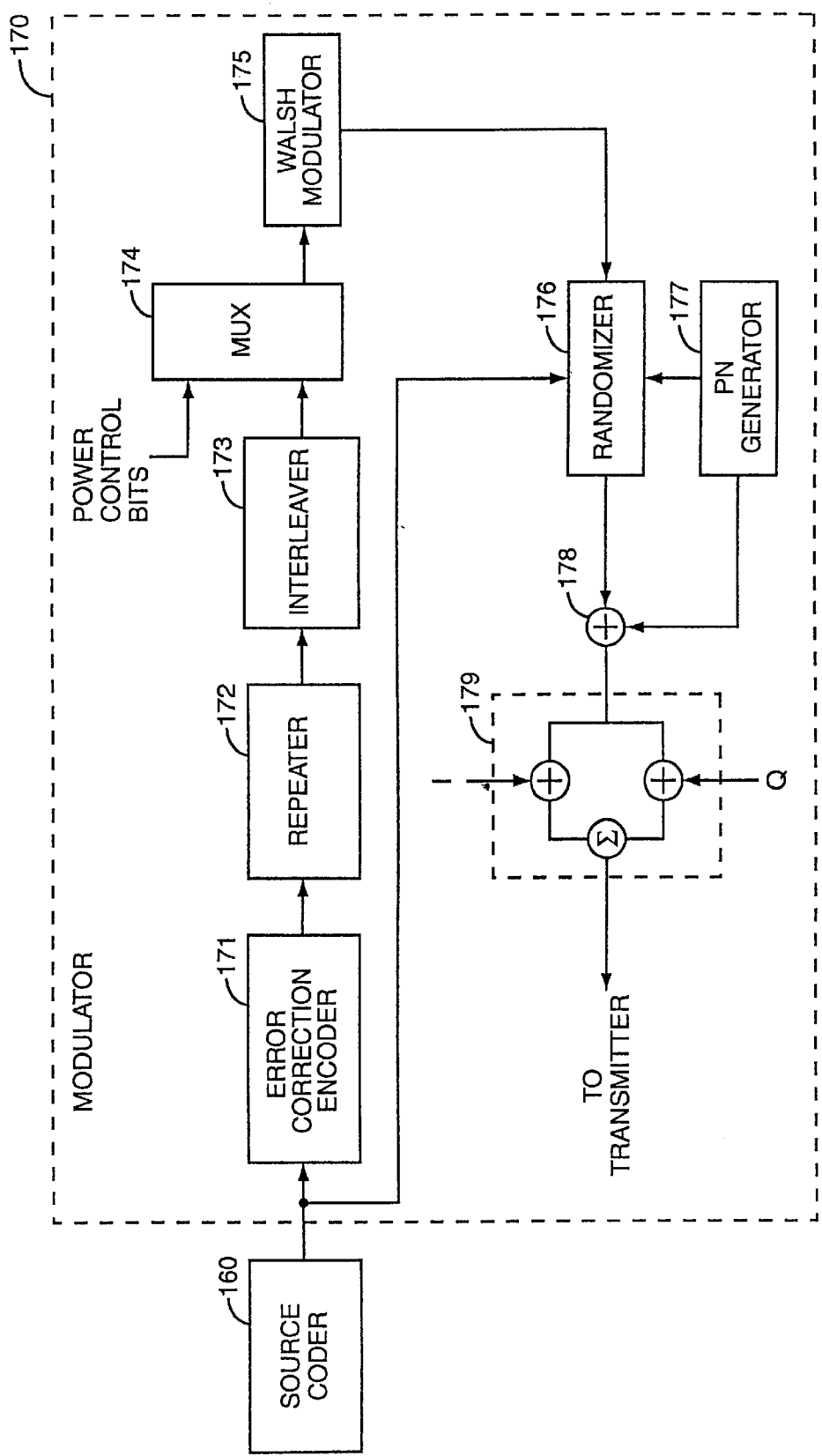
FIG. 3 is a functional block diagram illustrating the processing performed by the digital modulator in the mobile terminal of FIG. 2.
Figure 4:
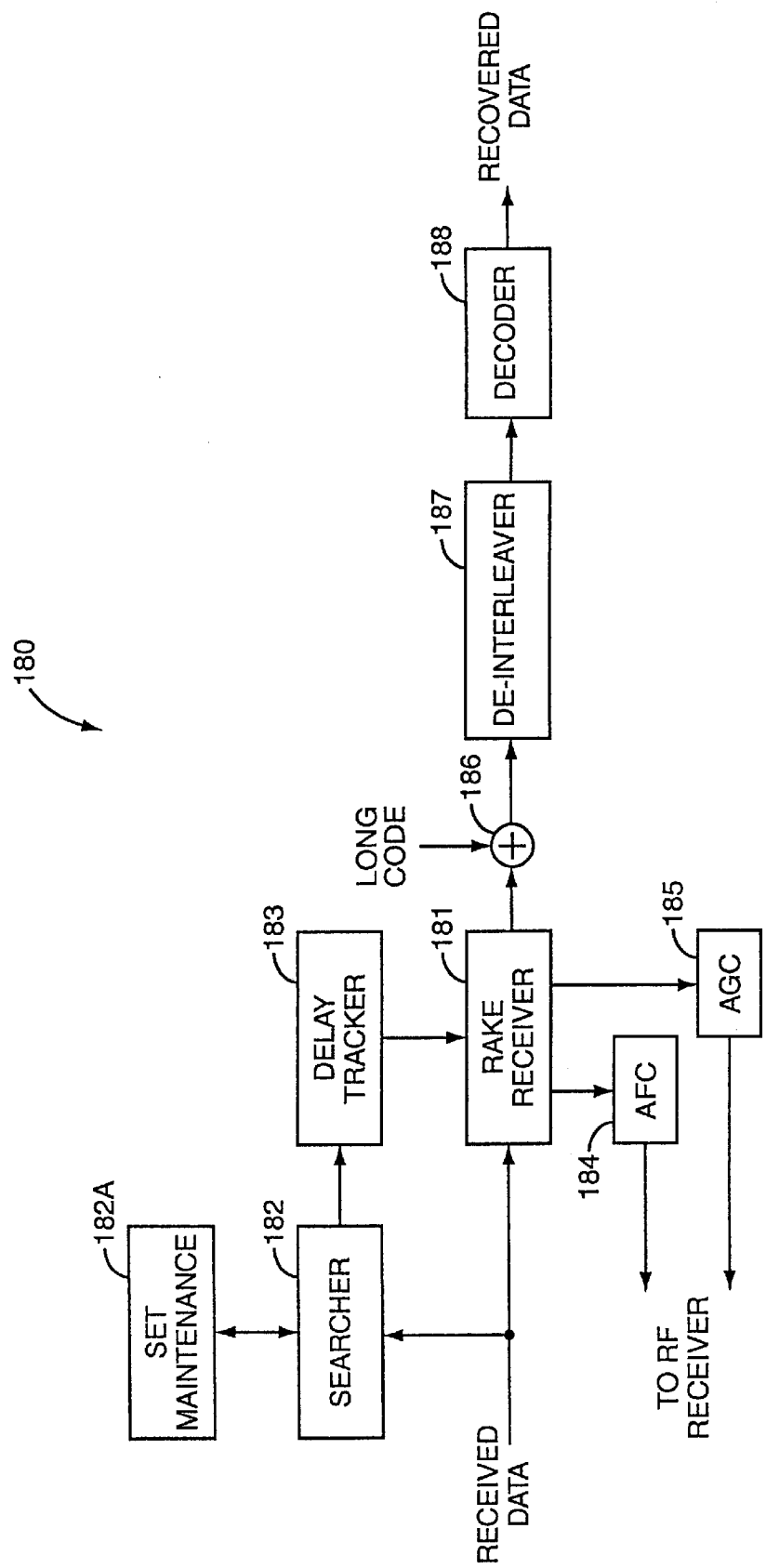
FIG. 4 is a functional block diagram illustrating the processing performed by the digital demodulator in the mobile terminal of FIG. 2.

FIG. 3 is a functional block diagram illustrating the processing performed by the digital modulator 170 in CDMA mobile terminal 100. The digital modulator 170 comprises an error correction encoder 171, repeater 172, block interleaver 173, multiplexer 174, Walsh modulator 175, randomizer 176, pseudo-noise generator 177, adder 178 and IQ modulator 179. An information source provides an information signal, such as speech or facsimile signals, to the source coder 160 which converts the information signal into digital form. The output of the source coder 160 is applied to error correction encoder 171 to render transmissions more tolerant to noise and interference. Error correction encoder 171 may, for example, comprise a convolutional encoder. The error correction encoder 171 adds controlled redundancy to the source encoded bits to aid in the detection and correction of errors that occur during transmission.

The encoded bits output from the error correction encoder 171 are spread by a symbol repeater 172. Symbol repeater 172 samples or repeats each symbol m times, where m is the spreading factor. Interleaver 173 scrambles the symbol sequence output by symbol repeater 172 and produces subframes, known as power control groups, that are typically 1.25 ms long. Thus, for each 20 ms frame, there are typically sixteen subframes. The power control groups are duplicated at data rates less than full rate. At half rate, there are eight different subframes that are each repeated two times. At quarter rate, there are four different subframes that are each repeated four times. At eighth rate, there are two different subframes that are each repeated eight times. The interleaver 173 does not add or delete symbols, but alters their order, for example, by transposing a matrix of n by m symbols. Alternatively, the interleaver 173 may be a helical, diagonal, or block diagonal interleaver rather than a block interleaver.

The output from the interleaver 173 is applied to a multiplexer 174. Multiplexer 174 adds power control information to the bitstring, for example, by adding a power control bit to each power control group output from the interleaver 173. The purpose of the power control information is to assist in forward link power control, as will be hereinafter described in greater detail.

The output of the multiplexer 174 is applied to a Walsh modulator 175. The Walsh modulator 175 maps symbols, typically six at a time, to one of 64 unique Walsh codes from the Hadamard matrix. The six symbols index different rows of the 64×64 Hadamard matrix. Walsh modulator 175 is not used for orthogonal spreading. The output from the Walsh modulator 175 is applied to a randomizer 176.

Randomizer 176 reduces the average power of the transmitter 130 by blanking out redundant power control groups generated by the symbol repeater 172. Randomizer 176 uses an algorithm based on a PN long code to pseudo-randomly blank the extra power control groups produced by the symbol repeater 172. This process reduces interference, increases system capacity, and improves the bit energy to noise density ratio ($E_b/N_o$).

The randomized data is combined with a PN sequence generated by the pseudo-noise generator 177, which is masked by the electronic serial number (ESN) of the mobile terminal 100. The ESN-masked PN sequence is combined with the randomized data output from the randomizer 176 by modulo-2 adder 178 to spread the signal over the spectrum of the transmit channel. The ESN-masked PN sequence is generated by the mobile terminal 100 and is offset from the network PN sequence by the ESN of the user. Masking of the PN sequence produces a large number of potential spreading codes to accommodate multiple users on the reverse link, thereby increasing spectral capacity.

The spread signal is applied to an IQ modulator 179. IQ modulator 179 uses I and Q short PN codes. The short PN codes are distinct $2^{15}$ chip sequences that are aligned to the forward link pilot by a time-tracking loop. To prevent simultaneous I- and Q-data changes, the Q data are delayed by one-half chip. The output from the IQ modulator 179 is used by transmitter 130 to modulate an RF carrier.

FIG. 4 is a block diagram showing a digital demodulator 180 for a CDMA mobile terminal 100. The digital demodulator 180 comprises a rake receiver 181, searcher 182, set maintenance list 182A, delay tracker function 183, de-scrambler 186, de-interleaver 187, and decoder 188. Searcher 182 determines rough synchronization for a number of received signal propagation paths, typically choosing the strongest multipath signals. The searcher 182 uses pilot channel information to characterize the selected propagation paths in terms of, among other things, path delay, gain, and phase shift. This process is known as pilot acquisition.

The delay tracker function 183 refines propagation path offset timing to develop more accurate propagation path delay values for use by the rake receiver 181. The delay tracking function 183 provides delay tracking, which accommodates small changes in propagation path delays. If large changes occur, the searcher 182 provides updated rough offset estimates for refinement by the delay tracker function 183. Information provided by the network denotes the pilot signal by PN offset. The mobile terminal 100 recognizes the PN offsets from the serving base station and their multipath components and, based on operation of the searcher 182 and delay tracking function 183, forwards the PN offsets with the highest cross correlation results to the rake receiver 181. The rake receiver 181 uses the pilot signal as a phase reference for coherent detection of the received signal. The rake receiver 181 removes modulation from the received signal but does not recover the message data. That is because the message data is still protected by convolutional coding, block interleaving, and scrambling applied by the base station transmitter.

To recover the message data, the output from the rake receiver 181 is first unscrambled by de-scrambler 186. De-scrambling requires synchronization of an internal PN generator to the sequence received by the mobile terminal 100. After unscrambling, de-interleaver 187 reverses the interleaving operation performed by the base station modulator. Finally, decoder 188 decodes the output from de-interleaver 187 to recover the original message data. Decoder 188 may, for example, comprise a Viterbi decoder or maximum likelihood sequence estimator (MLSE).

Two feedback controls are used by the digital demodulator 180 to track the strength and carrier frequency of the received signal. The automatic gain control (AGC) loop 185 adjusts the gain of the RF receiver 120 to overcome fading effects of the propagation channel. The automatic frequency control (AFC) loop 184 corrects the RF synthesizer 140 to obtain the proper baseband frequency after down conversion by the receiver 120.

Figure 5:
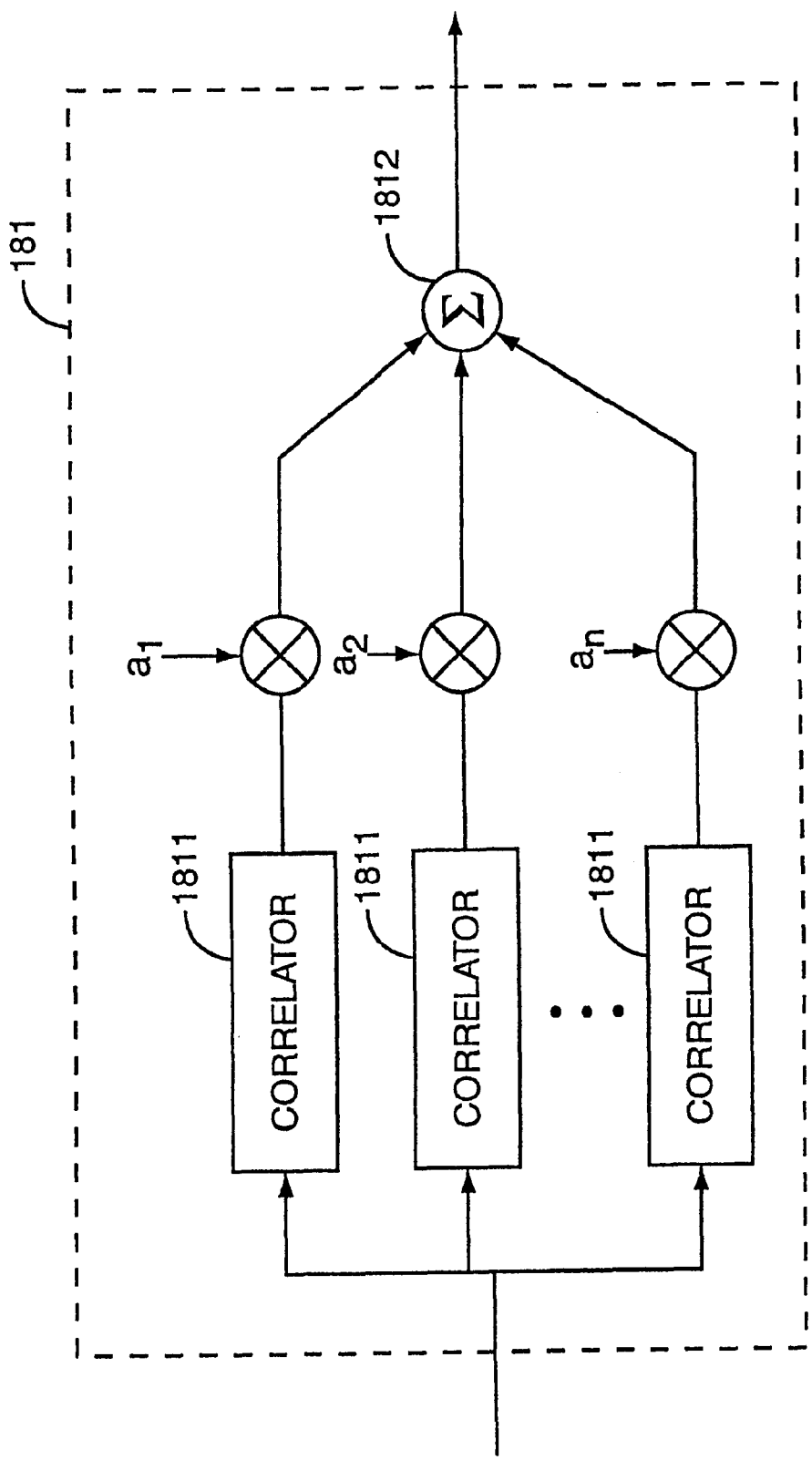
FIG. 5 is a functional block diagram illustrating the rake receiver in the mobile terminal of FIG. 2.

FIG. 5 is a block diagram illustrating the rake receiver 181 in more detail. The rake receiver 181 comprises a plurality of parallel correlators 1811 and a combiner 1812. Each correlator 1811 isolates a designated multipath component of the received signal. In general, the correlator 1811 resolves the designated multipath component and attenuates any other signals. The relative amplitudes and phases of the multipath components are found by correlating the received waveform with delayed versions of the signal or vice versa. The energy of the multipath components can then be recovered by combining the multipath components in proportion to their strengths. The output of each correlator 1811 is multiplied by a weighting coefficient e.g. $a_1, a_2, \ldots a_n$, based on the power or signal-to-noise ratio (SNR) from each correlator output. If the power or SNR is small from a particular correlator 1811, it is assigned a small weighting coefficient. Conversely, if the power or SNR is large, it is assigned a large weighting coefficient. The weighting coefficients are normalized to the output signal power of the correlator 1811 such that the sum of the weighting coefficients is one. Combiner 1812 combines the weighted output from each correlator 1811. The combiner 1812 may use a variety of combining techniques, including selection combining, maximal ratio combining, or equal gain combining.

While FIG. 5 shows a single rake receiver 181, the mobile terminal 100 may have two rake receivers 181 when transmit diversity is employed. The signals transmitted by the base station 12, referred to herein as the first and second diversity signals, would use a different PN sequence. The first and second rake receivers 181 would correlate to the different PN sequences to separate the first and second diversity signals.

The mobile terminal 100 of the present invention implements forward link power control. To briefly summarize, the mobile terminal 100 monitors the signal received on the forward link and compares the received signal to a predetermined channel quality standard. A variety of channel quality estimates may be employed, such as received signal strength (RSSI), frame error rate (FER), bit error rate (BER), signal-to-interference ratio (SIR), or a combination thereof. The goal is to maintain a desired minimum channel quality standard at the lowest possible transmit power level at the base station 12. To meet this goal, the mobile terminal 100 continuously measures the quality of the received signal and determines whether the transmit power should be incremented or decremented. The mobile terminal 100 transmits power control information to the base station 12. Typically, power control information is in the form of a power control code called the power control bit (PCB). A PCB having a value of +1 is used to request an increase in transmit power. Conversely, a PCB having a value of −1 is used to request a decrease in transmit power. Thus, the mobile terminal 100 assists the base station 12 to control power on the forward link.

Figure 6:
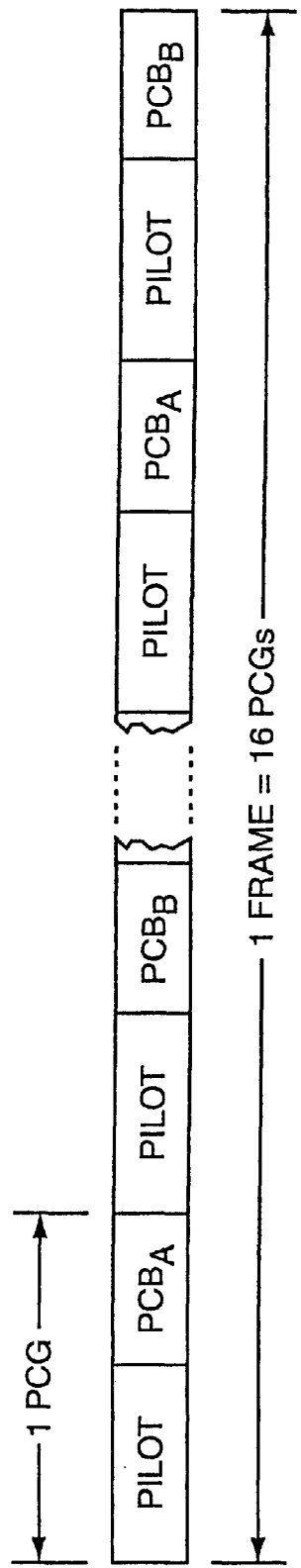
FIG. 6 is a schematic diagram illustrating the structure of the reverse pilot channel used by the mobile terminal to implement the forward power control method of the present invention.

In cdma2000, the PCB is transmitted to the base station 12 on the reverse pilot channel, although power control information could be transmitted on a reverse dedicated control channel (R-DCCH) or reverse traffic control (R-TCH). The reverse pilot channel (R-PICH) comprises the reverse pilot signal and multiplexed forward power control information, as shown in FIG. 6. The forward power control information, i.e., power control bits, is time-multiplexed with the reverse pilot signal and is referred to as the power control channel. The reverse pilot channel is divided into 20 ms frames. Each reverse pilot channel frame comprises sixteen reverse power control groups. The first ¾ of each power control group is used to transmit the reverse pilot signal. The last ¼ of each power control group is used to transmit PCB information. The PCB is updated in each PCG, so sixteen PCBs are transmitted in each 20 ms frame.

According to the present invention, first and second PCBs are time-multiplexed on the power control channel. A first group of PCBs from each frame, denoted $PCB_a$, is used to control the transmit power of a first antenna (e.g., antenna 12a), and a second group of PCBs from each frame, denoted $PCB_B$, is used to control the transmit power of a second antenna (e.g., antenna 12b), when transmit diversity is used on the forward link. Thus, the present invention permits the transmit power of each antenna to be controlled independently of the other antenna.

Time-multiplexing can be achieved in several ways. One way to time-multiplex power control information for two separate antennas is to designate one-half of the PCBs in each frame to control the transmit power of the first antenna and the other half to control the transmit power of the second antenna. For example, if the PCBs were numbered consecutively, even-numbered PCBs could be used to control the transmit power of the first antenna and odd-numbered PCBs could be used to control the transmit power of the second antenna. This assignment of PCBs has the effect of dividing the power control channel into two power control sub-channels—one for each antenna.

Figure 7:
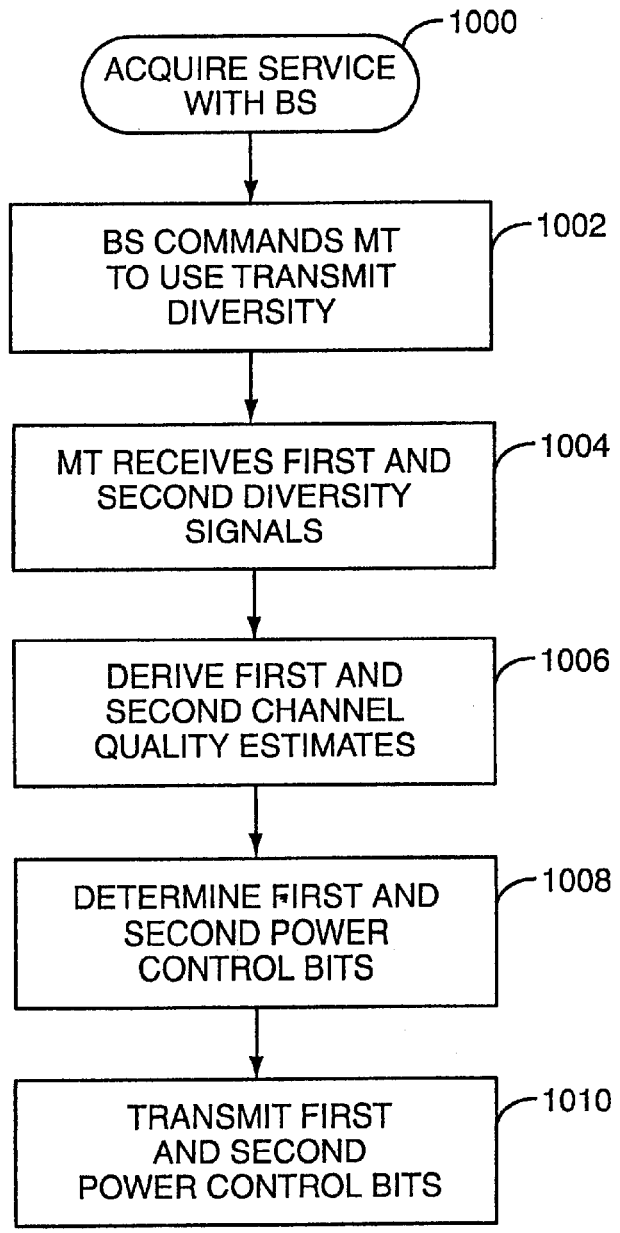
FIG. 7 is a flow diagram illustrating the forward link power control method of the present invention as implemented by the mobile terminal of FIG. 2.

FIG. 7 is a flow diagram illustrating the procedure for forward link power control according to the present invention when transmit diversity is used by the base station 12. The mobile terminal 100 acquires service with a base station 12 employing both forward link power control and transmit diversity (block 1000). The base station 12 commands the mobile terminal 100 to implement the power control for both antennas separately (block 1002). The command may include a target channel quality standard, such as a target frame error rate (FER) or signal-to-interference ratio (SIR). The mobile terminal 100 receives multipath components of the transmitted signal from each antenna 12a, 12b (block 1004). The mobile terminal 100 has a separate demodulator 180 to process signals from each base station antenna 12a, 12b. The multi-path components from each antenna 12a, 12b are combined by the mobile terminal 100 using standard diversity combining techniques, such as maximal ratio combining (MRC) or equal gain combining (EGC). The mobile terminal 100 generates a channel quality estimate, such as the signal to interference ratio (SIR), for the signal received from each of the two antennas 12a, 12b, as well as the combined signal SIR (block 1006). These can be denoted as $SIR_A$, $SIR_B$, and $SIR_{COM}$, respectively. In addition, the mobile terminal 100 measures the multipath channel gain, $G_A$ and $G_B$ for each antenna 12a, 12b (block 1006). The mobile terminal 100 then compares the target SIR and $SIR_{COM}$ and determines whether the total transmit power should be increased or decreased. Finally, the mobile terminal 100 compares the $SIR_A$ to $SIR_B$ and $G_A$ to $G_B$. Based on these comparisons, the mobile terminal 100 determines the power control bit for each antenna 12a, 12b (block 1008). The mobile terminal transmits the power control bits for each antenna 12a, 12b to the base station 12 in separate segments of the power control channel (block 1010).

As previously indicated, one method of dividing the power control channel is to assign adjacent power control bits to separate power control sub-channels. Thus, if the power control bits were consecutively numbered, even numbered power control bits would define a first power control sub-channel for the first antenna 12a, and odd numbered power control bits would define a second power control sub-channel for the second antenna 12b. This method of using alternating power control bits to define power control sub-channels for two antennas 12a, 12b is shown in FIG. 6. Other methods for dividing the power control channel into two or more subchannels could also be used.

The present invention results in a slight reduction of the update rate of the power control bits for each antenna 12a, 12b. The PCB rate for each antenna is power control bits per frame compared to the standard number of power control bits per frame (e.g., sixteen) when transmit diversity is not used. The reduction in the update rate of the power control bits means that the system is slightly less responsive to changes in the fading characteristics of the propagation channel. However, it is expected that transmit diversity will be used primarily in indoor environments where user mobility is low. Hence, the reduction in update rates is not necessarily a concern. Moreover, efficiency is gained by independently controlling the transmit power of each antenna 12a, 12b which may improve overall performance of the wireless communications network 10.

The present invention may, of course, be carried out in other specific ways than those herein set forth without departing from the scope and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A method of forward link power control implemented in a mobile terminal, said method comprising:

receiving first and second diversity signals transmitted by a base station;

deriving a first channel quality estimate based on said first diversity signal;

deriving a second channel quality estimate based on said second diversity signal;

determining a first power control code based on said first channel quality estimate;

determining a second power control code based on said second channel quality estimate; and transmitting said first power control code from said mobile terminal to said base station;

transmitting said second power control code from said mobile terminal to said base station.

2. The method of claim 1 wherein deriving said first channel quality estimate based on said first diversity signal comprises determining a frame error rate associated with said first diversity signal.

3. The method of claim 1 wherein deriving said first channel quality estimate based on said first diversity signal comprises determining a signal-to-interference ratio associated with said first diversity signal.

4. The method of claim 1 wherein deriving said first channel quality estimate based on said first diversity signal comprises determining a channel gain associated with said first diversity signal.

5. The method of claim 1 wherein deriving said second channel quality estimate based on said second diversity signal comprises determining a frame error rate associated with said second diversity channel.

6. The method of claim 1 wherein deriving said second channel quality estimate based on said second diversity signal comprises determining a signal-to-interference ratio associated with said second diversity signal.

7. The method of claim 1 wherein deriving said second channel quality estimate based on said second diversity signal comprises determining a channel gain associated with said second diversity signal.

8. The method of claim 1 wherein determining said first power control code based on said first channel quality estimate comprises determining said first power control code based on a comparison of said first channel quality estimate with said second channel quality estimate.

9. The method of claim 1 wherein determining said second power control code based on said first channel quality estimate comprises determining said second power control code based on a comparison of said second channel quality estimate with said first channel quality estimate.

10. A method of forward link power control implemented by a mobile terminal in a wireless communication system, said method comprising:

determining a first power control bit based on a first diversity signal received at said mobile terminal from a base station;

determining a second power control bit based on a second diversity signal received at said mobile terminal from said base station;

dividing a power control channel into first and second power control sub-channels;

time-multiplexing said first and second power control bits on said power control channel by transmitting said first power control bit to said base station in said first power control sub-channel and transmitting said second power control bit to said base station in said second power control sub-channel.

11. The method of claim 10 wherein dividing a power control channel into first and second power control sub-channels comprises:

dividing said power control channel into a plurality of frames, each frame of said power control channel comprising a plurality of power control groups;

assigning a first set of said power control groups in each frame to said first power control sub-channel; and assigning a second set of said power control groups in each frame to said second power control sub-channel.

12. The method of claim 11 wherein assigning said first set of power control groups to said first power control sub-channel comprises assigning odd or even power control groups to said first power control sub-channel, and wherein assigning said second set of power control groups to said second power control sub-channel comprises assigning even or odd power control groups to said second power control sub-channel.

13. A method of forward link power control implemented in a wireless communication system comprising a base station and a mobile terminal, said method comprising:

transmitting a first diversity signal from said base station to said mobile terminal;

receiving said first diversity signal at said mobile terminal;

deriving a first channel quality estimate based on said first diversity signal at said mobile terminal;

transmitting a second diversity signal from said base station to said mobile terminal;

deriving a second channel quality estimate by said mobile terminal based on said second diversity signal;

determining a second power control code by said mobile terminal based on said second channel quality estimate;

combining said first and second diversity signals to obtain a combined signal;

deriving a combined channel quality estimate from said combined signal;

determining a first power control code by said mobile terminal based on said first channel quality estimate, said second channel quality estimate, and said combined channel quality estimate;

determining a second power control code based on said first channel quality estimate, said second channel quality estimate, and said combined channel quality estimate;

transmitting said first power control code from said mobile terminal to said base station;

transmitting said second power control code from said mobile terminal to said base station;

adjusting the transmit power of said first diversity signal at said base station based on said first power control code; and adjusting the transmit power of said second diversity signal at said base station based on said second power control code.

14. The method of claim 13 wherein deriving said first channel quality estimate based on said first diversity signal comprises determining a frame error rate associated with said first diversity signal.

15. The method of claim 13 wherein deriving said first channel quality estimate based on said first diversity signal comprises determining a signal-to-interference ratio associated with said first diversity signal.

16. The method of claim 13 wherein deriving said first channel quality estimate based on said first diversity signal comprises determining a channel gain associated with said first diversity signal.

17. The method of claim 13 wherein determining said first power control code by said mobile terminal based on said first channel quality estimate, said second channel quality estimate, and said combined channel quality estimate comprises:

comparing said combined channel quality estimate with a predetermined channel quality standard to determine a power correction factor; and determining said first power control code based on said power control factor and a comparison of said first channel quality estimate with said second channel quality estimate.

18. The method of claim 13 wherein deriving said second channel quality estimate based on said second diversity signal comprises determining a frame error rate associated with said second diversity channel.

19. The method of claim 13 wherein deriving said second channel quality estimate based on said second diversity signal comprises determining a signal-to-interference ratio associated with said second diversity signal.

20. The method of claim 13 wherein deriving said second channel quality estimate based on said second diversity signal comprises determining a channel gain associated with said second diversity signal.

21. The method of claim 13 wherein determining said second power control code based on said first channel quality estimate, said second channel quality estimate, and said combined channel quality estimate comprises:

comparing said combined channel quality estimate with a predetermined channel quality standard to determine a power correction factor; and determining said second power control code based on said power control factor and a comparison of said second channel quality estimate with said first channel quality estimate.

22. A mobile terminal for implementing a forward link power control algorithm, said mobile terminal comprising:

first and second receivers to receive first and second diversity signals respectively from a base station; and power control logic to:

derive a first channel quality estimate based on said first diversity signal, said first channel quality estimate comprising at least one of a frame error rate, a signal to interference ratio, and a channel gain;

derive a second channel quality estimate based on said second diversity signal, said second channel quality estimate comprising at least one of a frame error rate, a signal to interference ratio, and a channel gain;

determine first and second power control codes based on said first and second channel quality estimates respectively; and a transmitter to transmit said first and second power control codes from said mobile terminal to said base station.

23. A mobile communications system comprising:

a base station having first and second antennas to transmit first and second diversity signals respectively;

a mobile terminal to receive said first and second diversity signals transmitted by said base station;

said mobile terminal being operative to:
- derive a first channel quality estimate based on said first diversity signal, said first channel quality estimate comprising at least one of a frame error rate, a signal to interference ratio, and a channel gain;
- derive a second channel quality estimate based on said second diversity signal, said second channel quality estimate comprising at least one of a frame error rate, a signal to interference ratio, and a channel gain;
- determine first and second power control codes based on said first and second channel quality estimates respectively; and
- transmit said first and second power control codes to said base station; and wherein said base station is responsive to said first and second power control codes to adjust the transmit power of said first and second antennas based on said first and second power control codes respectively.

* * * * *